Jan. 18, 1966 G. B. GERRISH 3,229,378
MULTIPLE TRAVERSE TRAY CONVEYOR
Filed Jan. 24, 1963 3 Sheets-Sheet 1
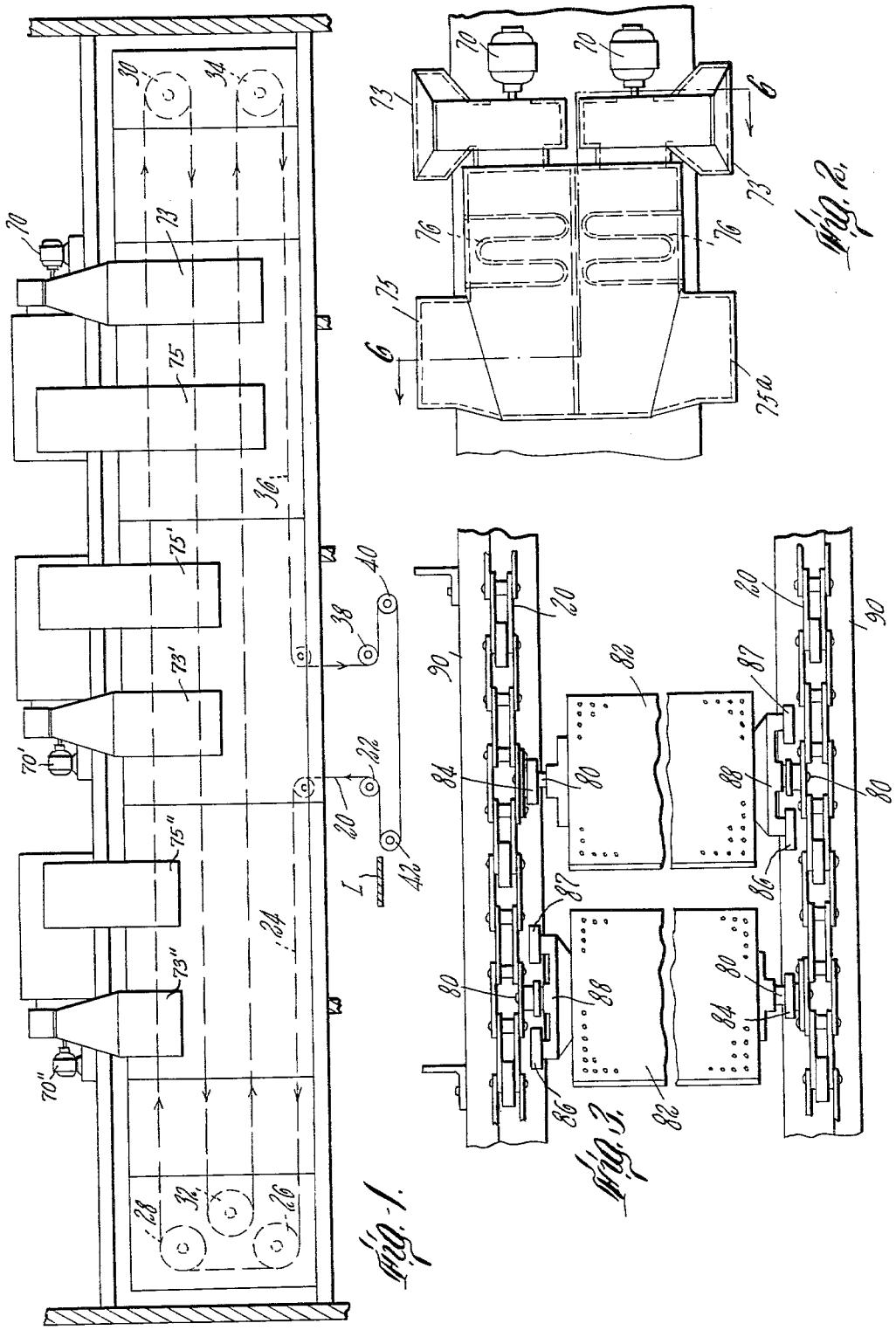

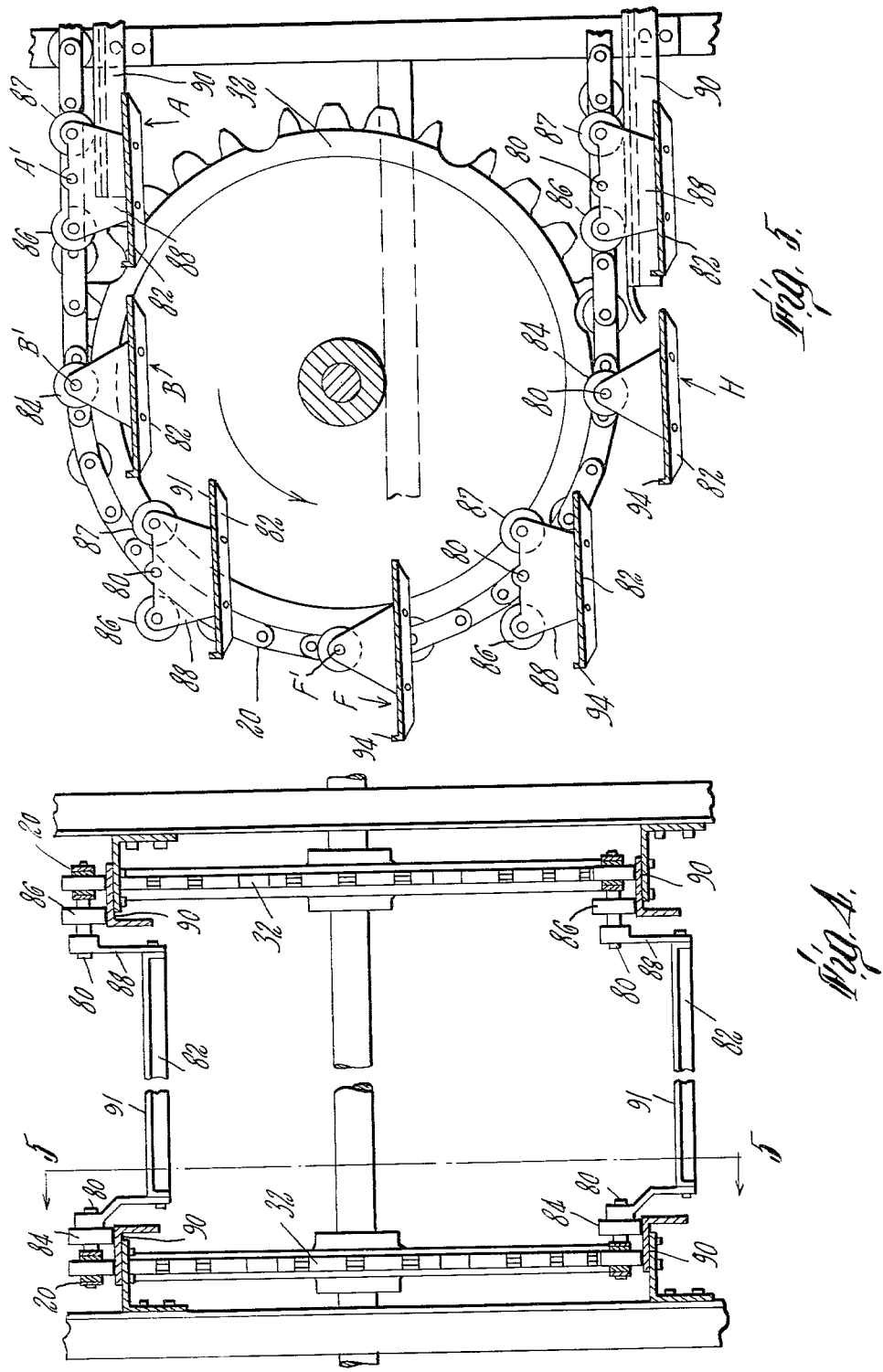

3,229,378
MULTIPLE TRAVERSE TRAY CONVEYOR
Grenville B. Gerrish, Melrose, Mass., assignor to Diamond International Corporation, a corporation of Delaware
Filed Jan. 24, 1963, Ser. No. 254,046
4 Claims. (Cl. 34—28)

This is a continuation-in-part of application Serial No. 15,664, filed March 17, 1960 now abandoned.

This invention relates to conveyors having vertically stacked generally horizontal traverses and more particularly to sprocket chain endless conveyors bearing a succession of trays for receiving articles to be conveyed, and wherein the trays are pivoted between spaced sprocket chains so that as the sprocket chains turn over around sprocket wheels in passing from one traverse to another traverse above or below, the trays do not invert.

Heretofore in multiple traverse tray conveyors it has not sufficed to merely pivot such trays between the parallel sprocket chains. The radii of the sprocket wheels are either so small or the rate of chain travel is so great, or both, that freely pivoting trays undergo wholly unpredictable oscillations, in extent, direction and/or frequency, as they decelerate in one horizontal direction and are reaccelerated in the other horizontal direction as they pass with the chains around the sprocket wheels. Cyclical speed changes of the conveyor chains due to friction or chordal action at the sprockets also causes swinging of the trays during the horizontal traverses. Such unpredictable oscillation cannot be tolerated because of the chances of pitching off articles carried on the trays if the oscillations are of too great extent or if the directions and frequencies of oscillation are so irregular as to cause bumping of adjacent trays. The latter difficulty is encountered only where the pivot circles of adjacent trays overlap, but such an arrangement is often desirable for achieving maximum load carrying capacity. Tray conveyors known to me are subject to such oscillations and tilting or have ingenious guides which engage rollers located in advance and rearwardly of the pivot points so as to afford at least a two-point and sometimes a three-point continuous contact of each side of the tray for preventing any tilting of the trays at any point in their paths of travel, including their travel around the sprockets.

The provision of such additional guides particularly for the sprocket passes, tends to complicate the conveyor mechanism and renders it more economical to use single horizontal traverse conveyors of a length corresponding to the sum of the lengths of the traverse in a multiple stacked conveyor, despite the added space required.

It is an object of this invention to provide a multiple tray conveyor having vertically stacked traverses which is simple in construction and yet wherein the tilting of the trays is so controlled, without the necessary use of guide rails at the sprockets that even light articles can be gravity retained thereon without inadvertent motion caused by undue tipping of any tray or by reason of any inadvertent contact of adjacent trays.

It is another object of the present invention to provide a drying device for pulp molded articles which is capable of operating at the same high rate of speed as the pulp molding machines without having the pulp molded articles thrown off the drying conveyor.

I have discovered that the unpredictable oscillations heretofore encountered at the sprockets is due largely to the tilting torque caused by friction in the pivots. Trays which have article receiving surfaces lying in planes intersecting the axes of their pivots on the chains exert against the pivot bearings as the trays enter into their decelerating horizontal motion at the end of each traverse a substantial force which, with normal bearings, creates a tilting torque due to friction which is unpredictable and tends to be non-uniform from one pivot to another. Accordingly one object of my invention is to reduce the force exerted against the pivot bearings during the decelerating horizontal motion so as to reduce the friction and render such friction as there is sufficiently ineffective to have any noticeable influence upon the motion of the trays. Thus having reduced the friction so that it is no longer an influencing variable, I so design the trays that their tilting motion during horizontal deceleration and acceleration is otherwise controlled to insure substantially uniform and regular tilt from tray to tray (to prevent clashing) and to limit the arc of tilting to insure that articles will not be inadvertently pitched from the trays.

In accordance with the above, frictional effects at the pivot of the trays are effectively eliminated by suspending the trays so that their article receiving surfaces are well below the axes of their pivots. By carefully choosing the critical dimensions of the suspended tray conveyors with regard to the sprocket wheels, the banking effect of a loaded conveyor traveling around a sprocket wheel is such that the article is thrown into the tray conveyors (rather than off), i.e. normal to the carrying surface of the conveyor, regardless of the pendulum-like swinging motion of the tray. In this manner part of the force exerted against the pivot bearings during horizontal motion deceleration is transferred from the pivot bearing to the suspended tray to thereby exert a swing-like banking effect of the tray in a direction in advance of the pivot axis. The center of gravity of the pivoting tray assembly and its moment arm are thus chosen for a predetermined sprocket radius and rate of chain travel that, with but small frictional influence, if any, the frequency of banking effect swinging motion is slightly less than half of the combined period of horizontal motion deceleration and acceleration of the pivot axis and with the effect of pendulum swinging being negligible.

The consequence is that the centers of the trays will, during deceleration of the pivot axes, swing outwardly in uniform repetition in advance of each pivot axis, reaching a point of maximum swing substantially when the pivot axis has decelerated to 0 horizontal motion. Each tray then returns through the same arc in a period approximately coinciding with the period of reacceleration of the horizontal pivot axis motion.

Such tilting of the trays as does take place, then, is in a direction tending to keep the articles on the trays both during horizontal motion deceleration and horizontal motion acceleration.

As a result it is found that even such light articles as fiberboard shapes or pulp molded articles are easily maintained on the trays through the multiple traverses of the drying oven at fairly rapid speeds.

Other objects and the nature and advantages of the instant invention will be apparent from the following description taken in conjunction with the accompanying drawings, wherein:

FIG. 1 is a diagrammatic elevational view of a multiple traverse tray conveyor positioned in an air-treating apparatus;

FIG. 2 is an enlarged detail plan view of a section of the apparatus shown in FIG. 1;

FIG. 3 is a detail plan view (broken away centrally to indicate extent) showing two successive trays in the tray conveyor;

FIG. 4 is an end elevational view partly in cross-section (broken away centrally to indicate extent) and on an enlarged scale showing the sprocket chains of FIG. 1;

FIG. 5 is a cross-sectional view (static) taken along the line 5—5 of FIG. 4.

Figure 6:
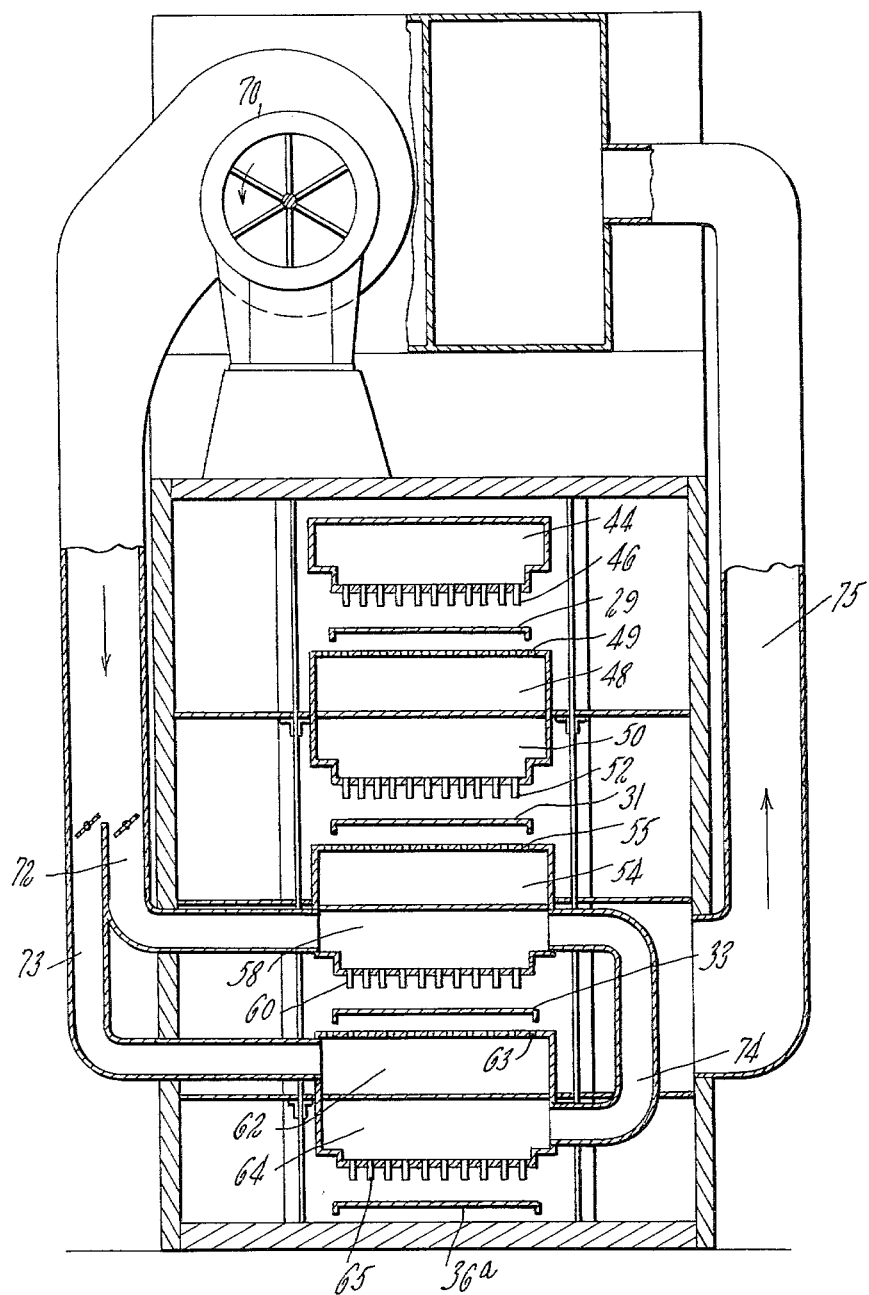
FIG. 6 is a cross-sectional view taken along the broken line 6—6 of FIG. 2.

FIG. 1 shows a multiple traverse tray conveyor which is designed to have an infeed beneath the apparatus and comprising an endless conveyor 20 which proceeds as from a loading station L around a pair of sprockets 22 up into the lower traverse 24 around a pair of sprockets 26 upwardly to a pair of sprockets 28 thence transversely to the sprockets 30 returning to sprockets 32 where the motion is again reversed towards sprockets 34 along the other half of the bottom in a traverse 36 and thence outwardly of the chamber around sprockets 38, 40 and 42, successively.

The geometry of the chain traverse and the radii of the sprockets wheels is so chosen for the purpose of this particular apparatus to provide three full traverses and two bottom half tray traverses, all of which the further indicated in FIG. 6 showing the upper full-length tray traverse 29, the middle full-length tray traverse 31, the bottom full-length tray traverse 33 and one of the lower half tray traverses 36a.

The apparatus is compartmentalized so that each of these traverses lies in a separate chamber and each of the upper three chambers is provided with a means for directing air streams both from above and below the respective traverse for drying (particularly pulp molded articles) or similar purposes.

Thus as shown in FIG. 6, tray traverse 29 in the upper section lies between an upper plenum 44 having a series of downwardly directed jet tubes 46 and a lower plenum chamber 48 having a series of apertures 49. The plenums and jets or orifices may extend any desired distance along the tray traverse 29.

Similarly the traverse 31 has an upper plenum 50, jet tubes 52 and a lower plenum chamber 54 having apertures 55; while traverse 33 has an upper plenum 58, jet tubes 60 and a lower plenum 62 with apertures 63.

The traverse 36 has only an upper plenum 64 and jet tubes 65.

FIGS. 2 and 6 also show closed circuit air ducts including fans 70, air ducts 72 and 73 leading to plenums 58 and 62 respectively, plenum 58 also feeding through duct 74 into upper plenum 64.

The exhaust air from these two lower traverses is returned on the sides of the apparatus through duct 75 and 75a leading as shown in FIG. 2 to separate steam coils 76 or other heating means and thence back to the fans. Similar duplex closed circuit circulation is provided for the middle traverse as shown in FIG. 1 including fans 70' and air ducts 73' and 75' and for the upper traverse as shown also in FIG. 1 including fans 70" and air ducts 73" and 75", the ducts in these cases being of correspondingly less vertical extent. Separation of the compartments permits use of different jet temperatures for each traverse depending upon the temperature of the coils 76 or other heating means. In general the hottest temperature is in the upper traverse 29.

The conveyor 20, as shown in FIGS. 3, 4 and 5, may be of normal construction and provided at regularly spaced intervals with pins 80 from which are suspended the trays 82. The pins 80 for successive trays carry rollers 84 on alternating sides of the trays and, on the opposite side of each tray from a roller 84, carry a pair of rollers 86 and 87 on bracket arms 88. In this way each tray has a three-roller supporting system which is used during the horizontal traverses with the rollers 84, 86 and 87 bearing against parallel rails 90, successive trays having their two roller sides on opposite guide rails.

The important feature to note, however, is that the upper surface 91 of each tray 82 is disposed in a plane well below the axes of the pins 80 so that, as shown in FIG. 5, as each tray begins to decelerate its horizontal component of motion, the inertia of the tray will tend to swing its leading edge upwardly, thus dissipating some of the force asserted against the pivot pin 80, but the moment arm is long enough to effect an angular displacement of the suspended tray relative to its vertical axis, and short enough to result in a much higher frequency and, consequently, low amplitude of the superimposed pendulum effect on the tray is long enough so that this causes the duration of the swing to be slightly less than half of the period of deceleration and acceleration so that by the time the tray has regained its reverse horizontal component of motion rate, it will have swung back to a horizontal position.

In order to obtain such a swinging action, the choice of dimensions is critical. Thus to synchronize the movement of the drier with the pulp molding machine to effect optimum drying conditions it has been found desirable to operate the drier at the same speed as the pulp molding machine. These machines run at high speeds between ½ to 2 feet per second. At such high speeds, the light paper pulp articles to be dried would have a tendency to fly off the suspended tray conveyors unless the dimensions were carefully chosen according to the present invention. To insure maximum drying with the utilization of minimum equipment area, it has been found that the diameters of the sprocket wheels 32 must lie between 28 and 50 inches. A sprocket between 35 and 42 inches in diameter has been found to be the optimum size.

The pivot radius has been found preferably to lie between 3" and 6" in length with a 4" arm the optimum length. If the pivot radius arm is greater than 6" in length the apparatus becomes bulky and unwieldly and the pendulum motion of the swinging trays begins to effect a significant and detrimental action and thus tends to decrease the desirable article-retaining banking effect. If the pivot arm is less than 6" in length the relative high frequency of the pendulum motion is merely cancelled out. However, if the length of the pivot arm is decreased below 3" in length, eccentric loading of the pulp articles becomes a problem because of the high rate of speed of the pulp molding machine and the drier. The loading of suspended trays 82 at station L is effected by the pulp molded articles being merely dropped onto the suspended trays 82. An article is not always dropped exactly on the center of a suspended tray at high operating speed and hence when one is dropped off to one side of a tray, i.e., loaded eccentrically, it will slide off the tray if the pivot radius is less than 3" in length. This is true because of the relative great weight of the pulp articles before they are dried, i.e., while loading, even though these articles are light in weight after drying. While they are being loaded they comprise from 50 to 70% water and the higher the molding speed (and therefore the higher the drying speed) the greater the percent of water in the molded pump articles, prior to drying and the greater will be the effect of eccentric loading.

Retaining flanges 94 may if desired be provided on one (as shown) or both end edges of the trays.

Because dryer equipment is placed between each horizontal traverse, the sprocket radii in such ovens is relatively large which aids in the accomplishment of the objects of the invention.

FIG. 5 being an illustration of the apparatus when not running, shows all the trays as they pass from one traverse to another in horizontal position. As will be understood, however, dynamically, tray F, the pivot axis F' of which is at practically 0 horizontal motion, will be, in operation at a limit of its pendulum tipping motion with its inner radius tipped downwardly. Tray A and its pivot axis A' are moving at a constant rate without acceleration or deceleration along parallel horizontal paths. The pivot axis B' of tray B is just about to start decelerating its horizontal component of motion with the result that the tray B will, as it passes around the sprocket wheel, reach the position of tray F. Thereafter as the pivot axis accelerates in the opposite horizontal direction, tray F will reach the position of tray H, there regaining its full horizontal rate of motion.

The arc of swinging motion is thus such that the center point of the tray reaches the limit of its swinging motion when the pixot axis of that tray reaches 0 horizontal motion and the frequency of the swinging motion is such that by the time the tray has swung back to a horizontal position its horizontal motion will be at a rate corresponding to and uniform with the rate of horizontal motion of its pivot axis in the return direction.

Such a tilting motion thus tends to prevent articles from sliding off the trays during deceleration or during acceleration of the articles, and because the swing of each tray is uniform with the other trays, bumping is prevented despite the fact that the tray pivots are spaced from one another a distance slightly less than the sum of the radii of the pivot circles of adjacent trays.

It will be obvious to those skilled in the art that various changes may be made without departing from the scope of the invention and therefore the invention is not intended to be limited to what is shown in the drawings and described in the specification, but only as set forth in the appended claims.

What is claimed is:
1. A method of relatively rapidly conveying articles along vertically stacked horizontal levels of a conveyor having closely adjacent suspended and pivoted trays, the distance between said horizontal levels being within the range of 28 to 50 inches and the distance between the article bearing surface of each tray and its point of suspension and pivot lying between 3 and 6 inches, comprising: dropping an article upon said article bearing surface of said pivoted conveyor tray having its center of gravity below its axis of pivot; horizontally moving the tray a substantial distance in a level path at a rate of travel between ½ to 2 feet per second; decelerating the horizontal velocity component of the tray at its pivot axis to zero as the pivot axis moves vertically one-half the distance from one horizontal level to another while maintaining the rate of travel of the pivot axis constant; simultaneously causing the carrying surface of the tray to swing freely outwardly with a banking effect from the pivot axis; accelerating the horizontal velocity component of the pivot axis in the negative direction as the pivot axis moves from the halfway point to the lower horizontal level while maintaining the rate of travel constant and simultaneously causing the carrying surface of the tray to freely swing back with a banking effect, the duration of swinging motion of the tray carrying surface being slightly less than half of the combined time of horizontal motion deceleration and acceleration of the pivot axis, the duration of the swinging motion being predictable to prevent the tray from contacting the closely adjacent trays.

2. In a dryer having drying means and a suspended tray conveyor, the combination of means to rapidly convey articles along vertically stacked horizontal traverses of substantial length comprising: article bearing trays positioned adjacent one another; chain means for carrying said trays, said trays being suspended from said carrying means a distance of from 3 to 6 inches and being attached to said carrying means by pivot attaching means to permit free swinging of said trays from said carrying means; prime mover means to effect movement of said carrying means at a constant rate of from ½ to 2 feet per second; sprocket means having diameters between 28 and 50 inches for supporting said carrying means, said sprocket means serving to effect deceleration of the horizontal velocity component of a pivot attaching means to zero as said pivot moves vertically 90° about said sprocket means while simultaneously causing an attached tray to swing freely outwardly with a banking effect about said pivot, said sprocket means further effecting acceleration of the horizontal velocity component of a pivot in the negative direction as it moves about the next 90° quadrant of said sprocket while simultaneously causing the attached tray to swing freely back, the duration of swinging motion of the tray being slightly less than half of the combined time of horizontal motion deceleration and acceleration of said pivot to effect banking of said tray about said sprocket as said pivot travels the first 90° about said sprocket to throw an article on said tray into, rather than off of, said tray.

3. A device in accordance with claim 2 wherein said sprocket diameter is between 35 and 42 inches and said distance of suspension is approximately 4 inches.

4. A device in accordance with claim 2 further comprising: a compartmentalized casing within which said conveyor makes multiple horizontal passes; means for feeding drying air to the interior of said casing; loading means along the length of said conveyor, said loading means operating to drop wet paper pulp articles onto said trays in sequence and at the same rate as the pulp molding operation and said constant rate of conveyor movement.

References Cited by the Examiner
UNITED STATES PATENTS

| | | | |
|---|---|---|---|
| 1,391,157 | 9/1921 | Wundrack. | |
| 1,393,003 | 10/1921 | Ayres et al. | 34—208 |
| 2,197,776 | 4/1940 | Argabrite et al. | 34—208 |
| 2,219,166 | 10/1940 | Schaefer | 34—208 |
| 2,663,624 | 12/1953 | Hutchins | 23—310 |
| 2,741,978 | 4/1956 | Cheftel et al. | 34—208 |
| 2,762,321 | 9/1956 | Cook | 34—208 |
| 2,807,892 | 10/1957 | Gerrish | 34—208 |
| 3,034,636 | 5/1962 | Manna | 198—158 |

WILLIAM F. O'DEA, Acting Primary Examiner.

NORMAN YUDKOFF, Examiner.